(12) United States Patent
Dixon (10) Patent No.: US 6,427,643 B1
(45) Date of Patent: Aug. 6, 2002

(54) INTERNAL COMBUSTION ENGINE WITH VARIABLE COMPRESSION RATIO

(76) Inventor: Michael Patrick Dixon, 19/17 Coorigil Road, Carnegie, Victoria 3163 (AU)

( * ) Notice: Subject to any disclaimer, the term of this patent is extended or adjusted under 35 U.S.C. 154(b) by 0 days.

(21) Appl. No.: 09/508,290

(22) PCT Filed: Sep. 8, 1998

(86) PCT No.: PCT/AU98/00728

§ 371 (c)(1),
(2), (4) Date: Mar. 14, 2000

(87) PCT Pub. No.: WO99/13206

PCT Pub. Date: Mar. 18, 1999

(30) Foreign Application Priority Data

Sep. 9, 1997 (AU) .............................................. PO9041

(51) Int. Cl.$^7$ ................................................. F02B 75/04
(52) U.S. Cl. ............... 123/48 A; 123/78 A; 123/78 AA
(58) Field of Search .......................... 123/48 A, 48 AA, 123/78 A, 78 AA (56) References Cited

U.S. PATENT DOCUMENTS

| 1,415,025 A | * | 5/1922 | Folsom | ................. | 123/78 AA |
| 2,049,253 A | * | 7/1936 | Ely | ........................ | 123/78 AA |
| 2,260,982 A | * | 10/1941 | Walker | .................. | 123/78 AA |
| 2,414,217 A | * | 1/1947 | Weiss et al. | ............ | 123/78 AA |
| 4,187,808 A | * | 2/1980 | Audoux | ................. | 123/78 AA |
| 4,286,552 A | * | 9/1981 | Tsutsumi | ............... | 123/78 AA |
| 5,476,072 A | * | 12/1995 | Guy | ..................... | 123/48 AA |

FOREIGN PATENT DOCUMENTS

| EP | 0086925 | * | 8/1983 |
| WO | WO 96/01940 | * | 1/1996 |
| WO | WO 97/11264 | * | 3/1997 |

* cited by examiner

*Primary Examiner*—Noah P. Kamen
(74) *Attorney, Agent, or Firm*—Edwin D. Schindler (57) ABSTRACT

A lean burn auto-ignition internal combustion engine which has a combustion volume which includes two parts one entering into the other, the volume of the second part being variable by control means (34) which takes into account the various operating parameters of the engine to ensure that auto-ignition takes place at a time which ensures maximum benefit from the ignited fuel charge. In a piston engine there is a secondary cylinder (30) and piston (31) entering into the main cylinder (10), the piston in the secondary cylinder being continuously movable to vary the compression ration of the combustion volume defined by the two pistons (11, 31) so that ignition takes place at a position of the movement of the main piston to ensure maximum utilization of the power generated by the ignited charge.

35 Claims, 3 Drawing Sheets

INTERNAL COMBUSTION ENGINE WITH VARIABLE COMPRESSION RATIO

BACKGROUND OF THE INVENTION

1. Technical Field of the Invention

This invention relates to an auto-ignition internal combustion engine and, in particular to such an engine which is adapted to operate under lean burn conditions.

2. Description of the Prior Art

Normal internal combustion engines are generally of one of two types, spark ignition petrol or gas engines and diesel engines which use auto-ignition, that is, fuel is injected under pressure into an air charge that has been compressed to a very high temperature and pressure After mixing with the charge air and after some time delay, ignition occurs by way of auto-ignition.

Air standard cycles show that if an internal combustion engine could be operated with a gas charge of increased adiabatic index then it will be more efficient. The same air standard cycles show that an increase in the index of about 0.1 would result in an efficiency gain of approximately 10% at any compression ratio. One practical way to increase the adiabatic index is to operate the engine at leaner fuel-air ratios. This is because air has the highest index over any temperature range for unburned and burned charge and the index decreases as the fuel-air ratio increases. When a stoichiometric mix is reached the burned charge index starts to increase again, however, rich mixture combustion is less efficient overall due to the lack of oxygen for the complete oxidation of fuel.

If an engine could be operated with an equivalence ratio (the mass of fuel delivered in the charge relative to the stoichiometric mass of fuel) of approximately 0.5 an average increase in the adiabatic index for the burned charge would be in the order of 0.06 and approximately 0.02 for the unburned charge (Internal Combustion Engine Fundamentals, Heywood, 1988). At lower equivalence ratios the index would be higher. On this basis if an engine were built with increased capacity and combusting the same amount of fuel as its smaller counterpart an increase in output would occur.

Currently spark ignition engines operate with an equivalence ratio of 0.8 as a limit in the lean burn region. This is due to the increased occurrence of combustion failure at equivalence ratios lower than 0.8. There are three main cause for this: failure in the first instance of the spark to initiate a flame leading to misfire; the flame encounters regions in the charge too lean to sustain combustion; the flame speed, or combustion speed, is too slow to consume the charge before expansion quenches the flame.

Air standard cycles indicate that another means of increasing an engine's efficiency is by increasing the compression ratio. The compression ratio defines the sum of the swept volume and combustion chamber volume divided by the combustion chamber volume. Air standard cycles show that an engine's thermal efficiency would increase by an average of one percentage point for every unit increase in compression ratio from approximately 8:1.

There are three main practical limits to increasing compression ratio to any order. As the compression ratio increases the surface to volume ratio increases and beat losses become excessive. The heat losses start to cancel the efficiency gains at a compression ratio of about 17:1. As compression ratio increases the peak pressures increase so that structural considerations and necessary weight increases pose a practical limit. Commercially available diesel engines generally appear to have a compression ratio of not more than 30:1.

However, spark ignition engines are limited to compression ratios of approximately 8:1 to 10:1. This limitation is primarily due to the spark ignition model fuel's tendency to 'knock'. That is, the last portions of the charge not yet combusted (termed the end-gas) is forced to elevated temperatures and pressures whereby it auto-ignites ahead of the flame front. This auto-ignition is often of an explosive nature which sets up large spatial pressure differentials causing audible sounds to emanate from the cylinder. This knock phenomenon increases as the compression ratio increases Knock is to be avoided for two main reasons. Firstly, knock can cause considerable physical damage to the engine if the engine is allowed to operate in the knocking load region for sustained periods. Secondly, knock reduces efficiency mainly through noise and vibration.

SUMMARY OF THE INVENTION

The object of the present invention is to provide an auto-ignition internal combustion engine which overcomes or minimises the difficulties previously enumerated.

The invention, in the broad sense provides an internal combustion engine being an auto-ignition engine including means associated with the or each combustion volume whereby the compression ratio can be varied in response to the variation of other operating parameters of the engine to provide efficient functional operation under various conditions.

BRIEF DESCRIPTION OF THE DRAWING FIGURES

In order that the invention may be more readily understood, it shall be described in relation to the accompanying drawings, in which.

DETAILED DESCRIPTION OF THE DRAWING AND PREFERRED EMBODIMENTS

Before referring specifically to the drawings, the engine of the present invention is a homogeneous charge lean burn, auto-ignition combustion engine operating at high compression ratios. The maximum equivalence ratio is of the order of 0.45 to 0.60 and the compression ratio range is of the order of 15:1 to 30:1.

The engine is an auto-ignition engine and uses a variable compression ratio to control the ignition timing.

Auto-ignition of a homogeneous charge offers a way to effect lean combustion. In this process a premixed charge of fuel and air (which is at very much less than stoichiometric proportions) is compressed to a sufficiently high pressure which causes a rise in temperature sufficient to cause self ignition (auto-ignition). This particular process does not depend on a flame initiating at any one point and then having to travel through the charge as in the spark ignition process. Rather, the temperature and pressure caused by compressing a charge from its initial temperature and pressure is experienced by all parts of the charge and thus combustion may be initiated in many places throughout the charge simultaneously. This overcomes any inhomogeneity which in the charge in a spark ignition device discussed above would not sustain a flame and thus would not provide power to the piston. As well, if combustion is not spatially dependent than temperature and pressure differentials should only be temporal. This would mean that vibration and noise caused by spatial pressure differentials, as is the case of inadvertent auto-ignition in spark ignition engines, would be non-existent.

Most fuels, including spark ignition fuels, exhibit the characteristic of self ignition if mixed with an oxidising agent and elevated to sufficiently high temperatures and pressures. Associated with the phenomenon of self ignition is a period of time which lapses, before ignition occurs, after the fuel/air mix is presented with temperatures and pressures sufficiently high to cause self ignition. This time lapse is called the 'ignition delay time' and usually decreases as the temperature and pressure increase and is measured in milliseconds.

For a homogeneous charge engine to be operated at varying loads and speeds as, for example, an automobile engine, the ignition delay lime and engine speed are closely related and require a method of control. If the engine speeds up the ignition delay time must decrease or be initiated earlier in the compression process and conversely if the engine slows the ignition delay time will have to lengthen or be initiated later in the compression process The consequences if the former requirement is not met is misfire. If the latter requirement is not met the consequence is inefficient advanced ignition.

Referring to spark ignition model fuels: at any given temperature and pressure significantly high enough to cause auto-ignition, iso-octane (100 octane rating) exhibits the longest ignition delay times and n-heptane (0 octane rating, 57 cetane rating) exhibits the shortest ignition delay time.

Self ignition studies conducted on iso-octane and n-heptane with shock tubes (Fieweger, Blumenthal & Adomeit, Combustion and Flame, 1997) show that with an equivalence ratio of 1, n-heptane ignition delay time: decreases from one millisecond at 750° K to approximately 0.7 milliseconds at 850 K; it rises to approximately 0.8 at 850° K; and decreases further with temperature increases to approximately 0.1 milliseconds at 1100° K Iso-octane of the same mixture strength and subjected to the same pressure exhibits a continuously decreasing delay time with increasing temperature. At 750° K the ignition delay time is approximately 8 milliseconds, at 850° K it is approximately 3 milliseconds and converging with n-heptane to approximately 0.8 of a millisecond at 1,000° K. Various mixtures of iso-octane and n-heptane fall between these two fuels[7] characteristics: the closer the fuel is to iso-octane the closer the fuel behaves as iso-octane The aforementioned study. also shows that a lean mixture iso-octane (equivalence ratio of 0.5 ) pressure at 40 bar, exhibits substantially higher ignition delay times for the given temperatures. For example 8 milliseconds at 900° K and 1 millisecond at 1,000° K and converging with the richer mixtures to 0.8 milliseconds at 1,050° K.

Another study (Halstead, Kirsch and Quinn, Combustion and Flame, 1977) on spark ignition fuels using a rapid compression machine shows a decrease in ignition delay time, for iso-octane, up to 650° K where ignition delay time is approximately 40 milliseconds, an increase up to 750° K where ignition delay time is approximately 45 milliseconds, then a decrease thereafter for increasing temperatures finishing at 5 milliseconds at 800° K. The same study shows that by decreasing the octane rating the ignition delay times decrease overall, however the same pattern prevails. For 70 octane rated fuels ignition delay time is 10 milliseconds at 650° K, 4 milliseconds at 700° K, 5 milliseconds at 800° K, and, 4 milliseconds at 833° K.

At elevated temperatures there is evidence of convergence of the delay times for all the fuels studied. The study also illustrates that at elevated concentrations the ignition delay times decreased for all temperatures. The elevated concentrations appear to have the same marked effect as decreasing the octane rating, thus reducing ignition delay times at any given temperature.

The data cited from these two studies illustrate several important facts relative to the use of these fuels and the successful operation of the engine of the invention. If the compression ratio is varied in an upwards direction the conditions (temperature and pressure), or, the geometric equivalent of a lower compression ratio, are pushed down the bore. A compression ratio of 12:1 for example will be coincident with some crank angle degree before top dead centre if the peak compression ratio is varied to a higher than 12:1 ratio. If the compression ratio is varied still further the 12:1 conditions are driven further down the bore. The converse is also true Varying the compression ratio downwards the 12:1 conditions then move up the bore. It is a fact that the 12:1 conditions will travel down the bore as the compression ratio is increased from 12:1 and upwards, but it will asymptote at approximately 30° before top dead center at a peak compression ratio of 30:1. A compression ratio of 100,000:1 will not move the 12:1 geometric equivalent any further appreciable distance down the bore. A compression ratio of 15:1 asymptotes closer to top dead center as peak compression ratio rises to 30:1. A 20:1 compression ratio asymptotes still closer to top dead center and so on.

Since the critical temperatures, as illustrated by the studies, lie above the 12:1 compression ratio, combustion will only occur in the latter stages of the compression stroke, that is, somewhere in the last 30 degrees before top dead center. An engine revving at 1,000 revs per minute will sweep out an angle of 6 degrees per millisecond and 24 degrees per millisecond at 4,000 revs per minute. The Fieweger data illustrates that the ignition delay times are of the same order of magnitude as the times for the engine to sweep out the angle between the angle with which 12:1 is coincident and top dead center.

The Halstead data illustrates that if the charge density is increased, as is the case of increased compression ratio, the ignition delay times are shortened considerably. This further illustrates the likelihood of controlling the occurrence of ignition at some point between 30 degrees before top dead center and top dead center, by varying the compression ratio.

As illustrated by the studies, the ignition delay time is a function of, the fuel octane rating; the mixture strength; temperature; and species concentration (pressure). In order to control the position at which ignition occurs, the 'ignition point', which will be at some specified point before top dead center, it is necessary to control where in the compression stroke, in terms of degrees before 'ignition point', these elevated self-ignition temperatures occur. The difference between the ignition point and the angle at which the self-ignition temperature occurs must account for the engine's angular velocity. That is to say, the time period the engine takes to sweep out this angle difference must equal the ignition delay time if ignition is to be coincident with the 'ignition point'. This will be effected by varying the compression ratio. Varying the compression ratio effectively forces the conditions, that is pressure and temperature associated with a specific compression ratio, at which ignition will occur up and down the bore.

Increasing the compression ratio effectively advances the ignition timing as it presents to the charge higher temperatures and pressures overall and presents elevated temperatures and pressures sooner. The converse is also true. That is, decreasing compression ratio retards the ignition timing.

Increasing the engine speed will retard the ignition timing as the engine will traverse a greater angle over the ignition time delay. To counter this it is necessary to increase the compression ratio some appropriate amount. Reducing engine speed will advance the ignition as the engine will traverse a smaller angle over the ignition time delay. To counter this the compression ratio must be decreased some appropriate amount. An increase in the equivalence ratio (increased load) will advance the ignition timing (increase species concentration) therefore it is necessary to reduce the compression ratio by the appropriate amount. A decrease in the equivalence ratio will retard the ignition timing and therefore it is necessary to increase the compression ratio by the appropriate amount.

To deal with changes in ambient conditions the compression ratio range will have to shift up for decreases in ambient temperature and down for increases in ambient temperature. For example, for an ambient temperature of 25° Celsius the compression ratio may range from 28:1 at idle, through to 19:1 for full fuel delivery at 1,000 revs per minute. If ambient temperature were 0° Celsius the compression ratio may range from 30:1 at idle, through to 22:1 for full fuel delivery at 1,000 revs per minute.

The octane rating of the fuel will shift the compression ratio range in a similar manner. That is, high octane ratings result in higher compression ratios overall, and, lower octane ratings, lower compression ratios overall.

A numerical model has been written coupling a quasi dimensional engine model with the Halstead et al. Hydrocarbon Fuel Auto-ignition Model.

The cycle simulations illustrate that an engine of the type of the invention is capable of reducing fuel consumption by approximately 33% over its spark ignition counterpart for the same output. For an engine of the invention operating with a delivery ratio of 0.45 and a compression ratio of 22:1 the capacity needs to be increased by approximately 20% to attain the same output at the same revs as a spark ignition engine operating with wide open throttle, equivalence ratio of 0.9 and a compression ratio of 9:1.

The numerical model illustrates that a constant peak pressure can be attained at any equivalence ratio (from minimum to maximum) from 1,000 revs per minute to 4,000 revs per minute by applying a suitable compression ratio. This suggests one particular control system element. That is, the compression ratio adapts to suit the load-speed requirement by the compression ratio varying mechanism always being under the influence of a constant or near constant, following external force. By changing the magnitude of this force the engine is readily adapted to suit shifts in ambient conditions. That is, increase the force for cold conditions and decrease the force for hot conditions. The same applies for the fuel octane rating changes increase the force for higher octane rating, and decrease the force for lower octane rating.

There are several other aspects of the engine control system that need to be considered. Increasing fuel delivery does not present a problem but decreasing the fuel delivery from high fuel delivery and low compression ratio mode does. It may be necessary to cut the fuel off altogether if the rate of reduction leans the mixture out to such an extent that a misfire is possible. The fuel remains cut off until the compression ratio adapts to the appropriate level required or until the fuel metering is adequately increased. Such a situation may occur for example when changing gears. Whatever the final configuration of the engine control system, and if it transpires that a constancy of peak pressure does not occur, the control system must control the fuel delivery and adapt the compression ratio as appropriate for any given load and speed. It must also adapt the engine to the ambient conditions and fuel octane rating. The engine may be equipped with a cold start system (such as glow plugs) and may recirculate hot exhaust gases if required. These variables are ultimately under the control of the engine control system.

In relation to emissions, because of the leanness of mixture throughout the entire load range, oxides of nitrogen will only be produced at approximately ⅛th of the rate of that of a same powered spark ignition engine reducing to near zero at ½ full load range. Carbon monoxide will be produced at about ½ the rate of the spark ignition counterpart. It is expected that hydrocarbon emissions will be produced at a greater rate than the spark ignition counterpart because the peak temperature and exhaust temperature will be much lower than the spark ignition counterpart. Since knock is not a problem with this engine it will be possible to use thermal shielding such as ceramic shielding on the piston crown and cylinder head. This will help reduce hydrocarbon emissions.

Thermal shielding has an added advantage of increasing the efficiency of the engine due to reducing heat losses. Another synergy that may be utilised is that if swirl and turbulence are not necessary as combustion aids then the limiting of these through geometric enhancement of manifolds, ports etc. may well reduce the heat transfer coefficient thus reducing heat losses further.

The heat release rate defines the rate at which the fuel is combusted. If this rate is extremely high the pressure rise may be rapid enough to cause detrimental effects such as structural damage or inefficiencies. This is a consideration that may never eventuate no matter how rapid the fuel consumption is. However a study on compression-ignited homogeneous charge combustion (Najt & Foster, SAE, 1984) with a four-stroke cycle Waukesha CFR engine showed the fuel being consumed over approximately 4 crank angle degrees at 600 revs per minute. If this data can be extrapolated to 4,000 revs per minute the crank angle would be in the order of 24 degrees. This indicates that the energy release rates are not instantaneous and do not pose a problem. This particular study indicated that the equivalence ratio of approximately 0.4 was a limit if knock-like pressure oscillations were to be avoided. However, pressure traces from a study on ignition of fuels by rapid compression (Taylor, Taylor, Livengood, Russell & Leary, SAE, 1950) indicates that equivalence ratios as high as 0.6 can be used without knock-like pressure oscillations.

Carnot efficiency defines the absolute limit of efficiency that a heat engine can attain operating between a heat reservoir of temperature $T_P$ and a cold reservoir of temperature $T_c$. Carnot efficiency is given by the formula 1−temperature cold divided by temperature peak ($1-T_c/T_P$). It is generally considered that the higher the peak temperature the greater the limit of efficiency. For internal combustion engines the rejection reservoir is the atmosphere and the coldest possible temperature is ambient temperature. It is not possible to bring exhaust temperatures down to ambient temperature through an expansion process if the expansion process is limited to atmosphere pressure. Therefore, Carnot efficiency is not directly applicable to internal combustion engines. However, Otto efficiency which is given by the formula (1−Temperature Exhaust/Temperature Peak) can be. As applied to a practical engine it is actually the quotient $T_e/T_p$ that sets the limit of efficiency. The exhaust temperature is inextricably linked to the atmospheric pressure as well as peal temperature and pressure. If the expansion ratio were great enough to allow the cylinder pressure to equal atmospheric pressure as a practical limit this would then set the lowest exhaust temperature for a given peak temperature. If the peak temperature is set still higher the expansion ratio must then be made larger in order to lower the exhaust temperature if any efficiency is to be gained. So it can be seen that it is really the quotient of $T_e/T_p$ that sets the Otto limit as applied to real engines. It appears to be that over practical expansion limits lower peak temperatures (to a certain limit) allow for smaller values of the quotient. This may well be due to the higher adiabatic index and lower species dissociation over the expansion cycle due to the lower temperatures over the expansion cycle. Since Carnot efficiency bounds Otto efficiency up to the same peak temperature and since Otto efficiency bounds practical engine efficiency, any gains in efficiency of a real engine cannot be in violation of any fundamental laws of thermodynamics.

Referring Now to the Figures

Figure 1:
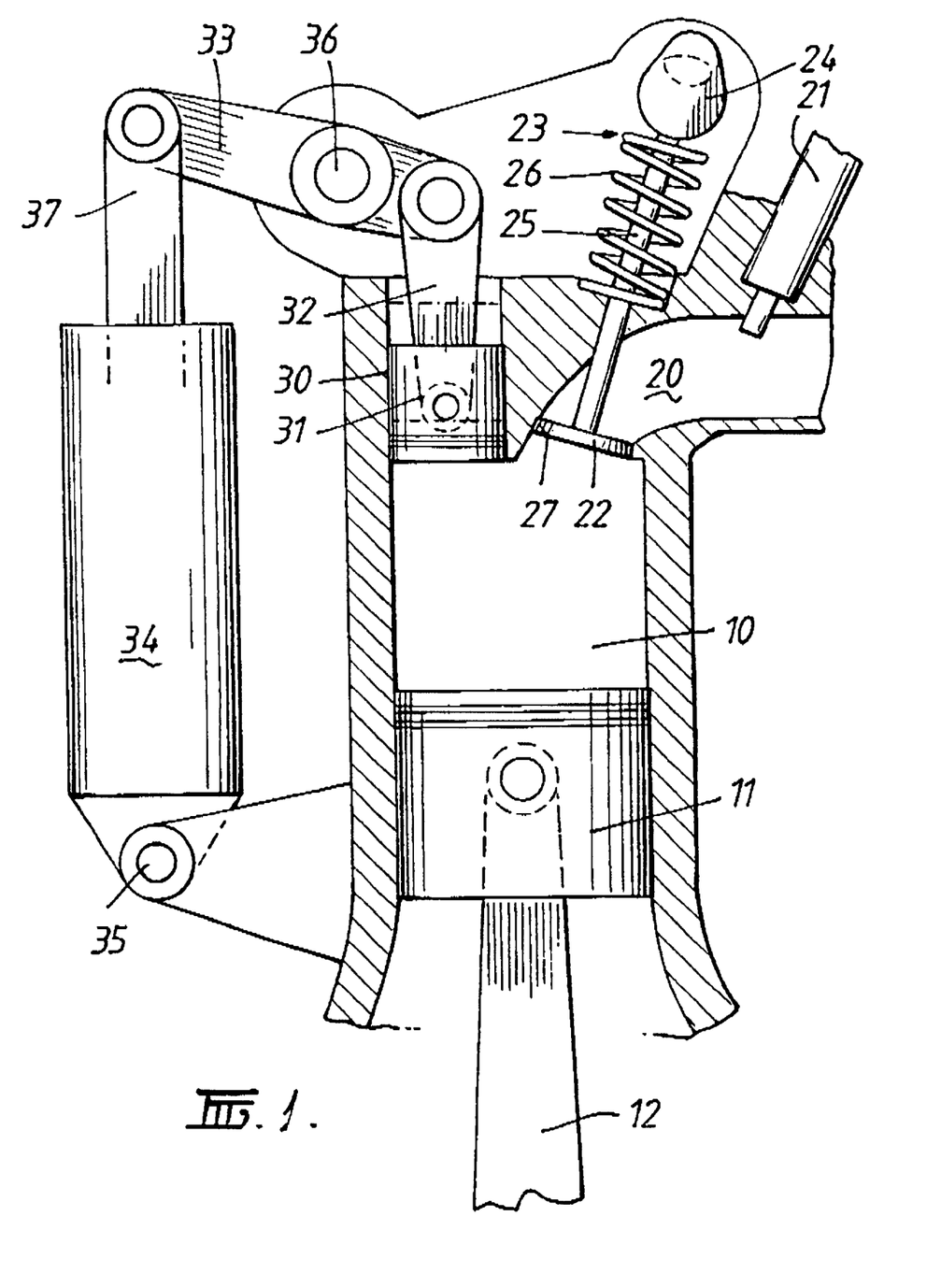
FIG. 1 is a schematic view of one cylinder of the engine of the invention incorporating the features of the invention.

Figure one shows a schematic view of an engine which demonstrates the properties of the invention. The engine can be a petrol engine or it could be a gas engine using, say butane or a mixture of butane and propane or a compressed natural gas. As illustrated we show only one cylinder 10 in which there is located a piston 11 and these can be considered more or less conventional although, as previously discussed, the arrangement must be such as to be able to be operated under high compression ratios. Normally, of course, there will be a number of cylinders.

The piston 11 has a connecting rod 10 which is connected to a crank shaft not shown.

There is an inks arrangement 20 which may include a fuel injector 21 and inlet valve 22 and the valve operating mechanism 23 which as shown has an overhead cam operating cam 24 operating directly on to the top of the valve stem 25 and there is a valve spring 26 which acts to move the valve back onto its seat 27 when this is possible with the particular position of the cam 24.

The cylinder head is also provided with one or two exhaust valves which are not illustrated in the figure.

The engine has a supplementary cylinder 30 which is in connection with the cylinder 10 and incorporates a piston 31 which is connected by a connecting rod 32 and a link 33 to a controller 34.

As shown the controller is pivotly connected at 35 to the engine block so as to be able to rotate somewhat when the link 33 is caused to move around pivot 36.

It will be seen then that the total volume of the particular cylinder of the engine can be considered to be the volume of the cylinder 10, when the piston 11 is in its lowest position plus the volume defined in the cylinder 30 by the position of the piston 31.

As the compression ratio is dependant upon the total volume of the cylinder and the volume swept by the piston it can be seen that the engine of the invention provides the possibility of variable compression ratios between two position, one effectively that is shown in FIG. 1 where the piston 31 leaves little of the cylinder 30 available to a position shown in dotted lines in that figure when the piston is retracted.

It will be further seen that this compression ratio can be varied by the position of the piston 37 extending from the controller 34 and this in turn can be controlled by taking into account the various parameters previously referred to.

Particular means of control will be described later herein.

During operation of the motor, the compression ratio can be continually varied to ensure that the auto-ignition occurs at the right place in the movement of the piston 11 to ensure that auto-ignition occurs so that this is becoming basically complete when the piston 11 reaches the top of its stroke and thus the maximum downward force on the piston is achieved by the pressure of the combustion gases.

As discussed earlier, the control system causes the movement of the piston 31 under a number of conditions.

Firstly if the engine is to be started or is running at idle, the compression ratio must be increased, that is the piston 31 must move down in its cylinder. As fuel delivery is increased the compression ratio must decrease as the engine departs from the starting and idle settings.

Where the engine is running under constant fuel intake and engine speed increases, the main piston will traverse a greater distance and thus the compression ratio must be increased so that ignition occurs earlier in the movement of the piston to give sufficient time for ignition to occur before the relatively rapidly moving piston reaches top dead centre or slightly there after.

The base position of various aspects will control the situation generally, these include the octane of the fuel used, the temperature of the incoming air charge, the temperature inside the cylinder.

Where the engine speed is to be reduced at some given fuel delivery, then the rate of travel of the piston 11 is slower, the compression ratio needs to be reduced to take this into account.

As fuel delivery decreases, as engine load requirements decrease, the compression rati must increase.

In each of these cases I may control not only the compression ratio but also the amount of fuel to be injected.

It is to be kept in mind that the engine operates under lean burn conditions but under each operating condition there must be sufficient fuel to ignite at the required position of movement of the piston.

Particularly where fuel input is to be reduced, such as when the engine revolutions are being reduced it may be necessary to cut fuel injection off altogether if the rate of reduction leans the mixture to such an extent that a misfire is possible, although, as discussed earlier, the engine of the invention, operated properly should normally not misfire.

Once the compression ratio reaches the required position and the fuel is then reinjected at the required rate. This situation may occur for a short period, for examples when gears are being changed.

As mentioned above a particular arrangement for the movement of the piston 30 is purely exemplary.

Figure 2:
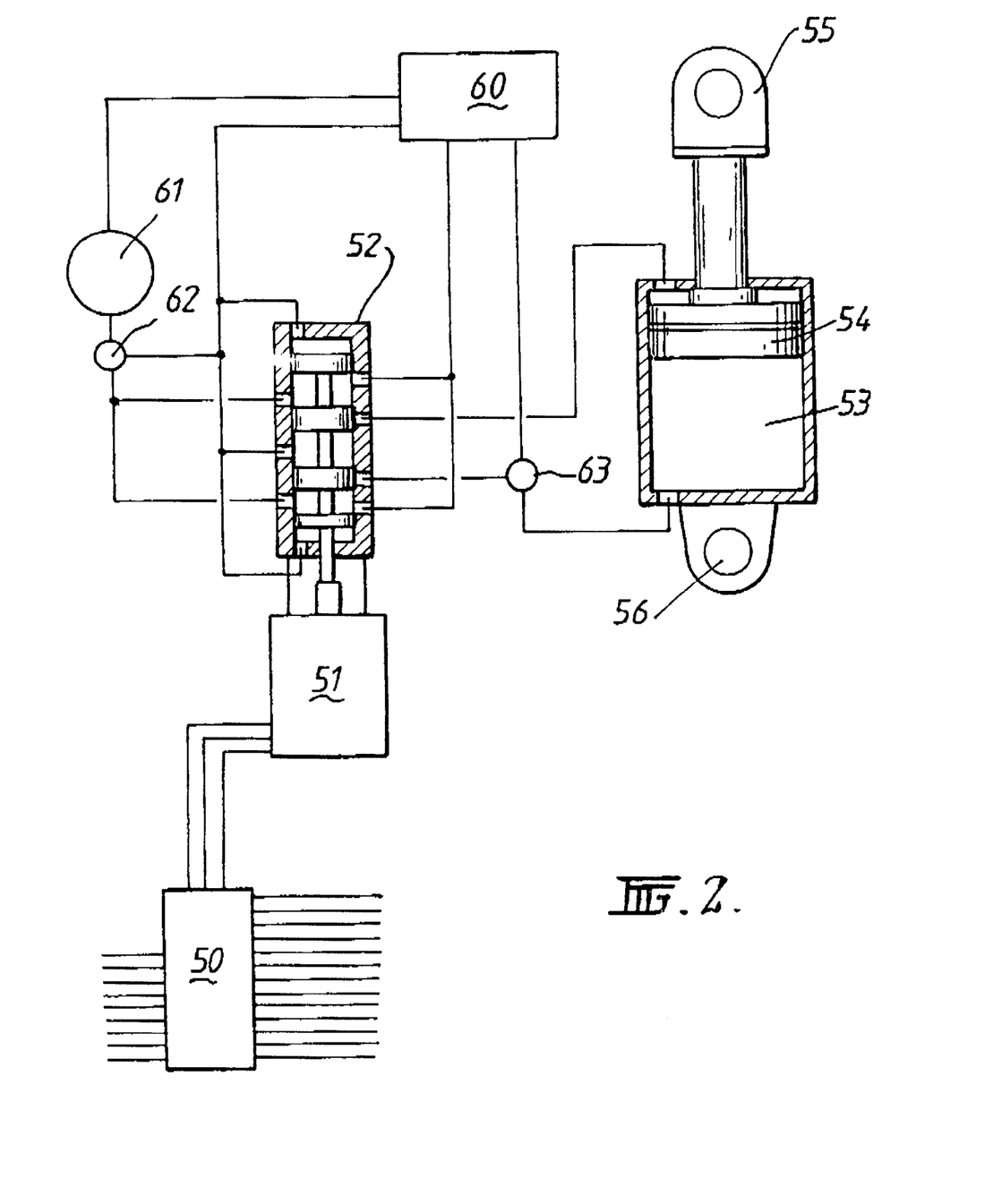
FIG. 2 is a schematic view of one form of control system which could be used with the engine of FIG. 1.

FIG. 2 shows an arrangement where by the various parameters are fed to a central processing unit and its associated memory 50 this, in turn sends signals to operate a bi-directional actuator which actuates hydraulic valve 52 which causes movement of the secondary cylinder not shown by a hydraulic ram arrangement 53 which has a piston 54 and which is connected between a fixed point by means of journal 56 and to the operative shaft of the piston by means of a connection to journal 55.

The arrangement includes an oil reservoir 60 and oil pump 61 to maintain pressure relief valve 62 and an engine cylinder relief valve 63.

This valve 63 opens and releases any excess pressure when this reaches a predetermined value to protect the engine and can also operate if the fuel load is increased when the engine is operating under high compression to assist in reducing the compression ratio as the secondary piston moves to enlarge the combustion volume and reduce the compression ration to be appropriate for the new fuel load.

Figure 3:
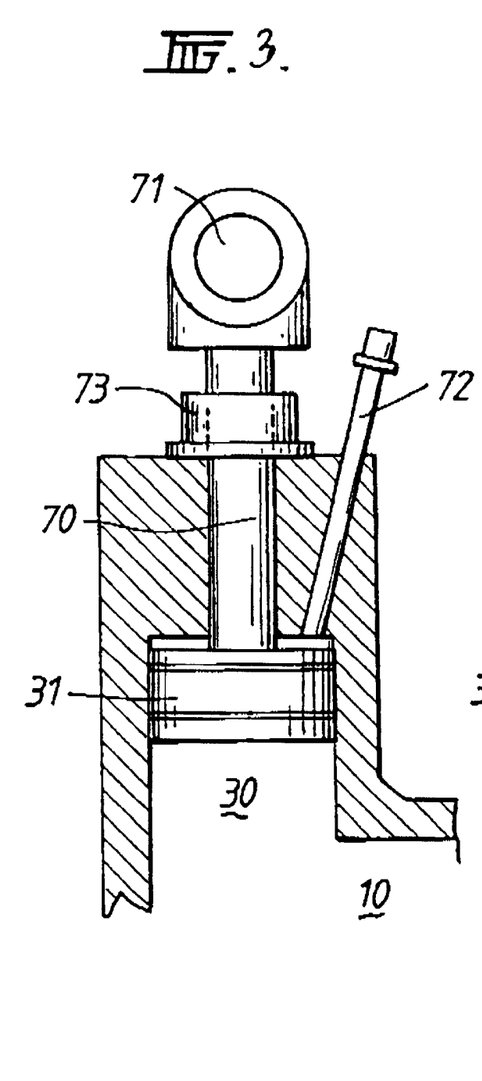
FIG. 3 is a schematic view of one method of moving the secondary piston.

FIG. 3 shows an arrangement which can be used with the system of FIG. 2 in which the secondary piston 31 and its cylinder 30 can be in connection with a shaft 70 which can be located in a varying arrangement and oil seal arrangement which has a journal 71 attached thereto which can be in direct connection with the journal 56 shown in FIG. 2 or, alternatively, the two members can be interconnected by a shaft or the like.

There is a gas bleed 72 for any gas which passes the rings of the piston 31 and this has an oil deflection cap.

Figure 4:
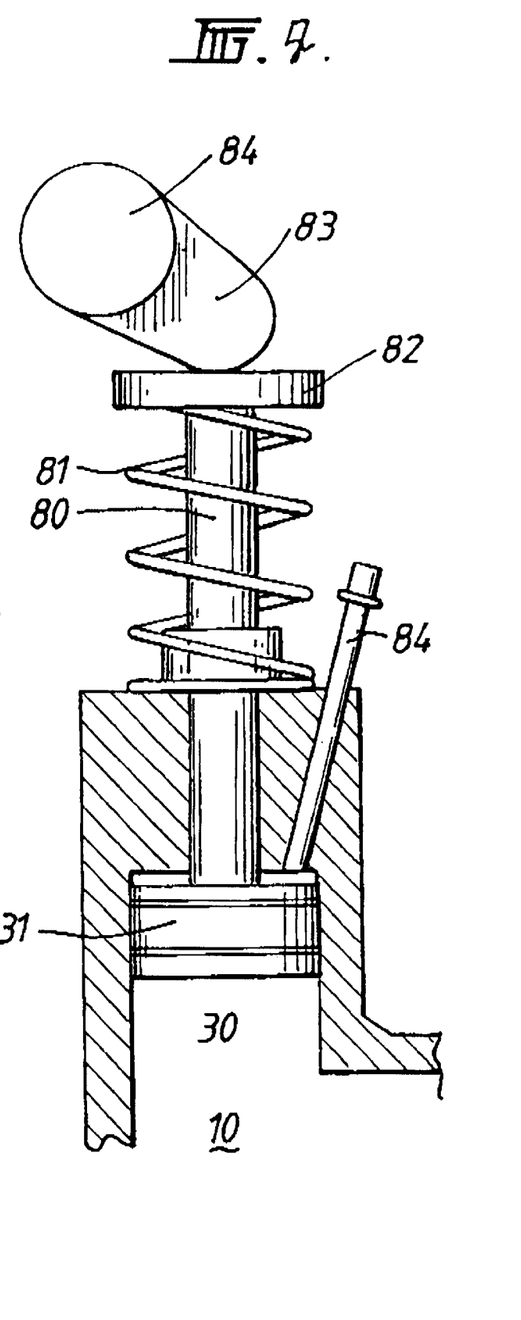
FIG. 4 is a schematic view of a second method of moving the secondary piston.

FIG. 4 shows a cam operated arrangement wherein a cam 83 connected to a cam shaft 84 acts on a cap 82 associated with a shaft 80 which is in connection with the secondary piston. In this case the cap 82 against which the cam operates also acts as a member against which helical spring 81 can operate so that the normal position of the piston 31 is in the low compression ratio position but is moved downwardly as required by rotation of the cam shaft 84 and the operation of the cam 83 on the upper surface of the 82.

The cam shaft 84 can be operated by a servo-motor or the like which can be controlled by a CPU arrangement such as that shown as 50 in FIG. 2.

These two arrangements are purely exemplary and the position of the piston 31 can be controlled in any required manner.

For example, it is possible to use a spring of a substantial effective length to act directly against the secondary piston. The concept of using a long spring is that this will apply a relatively constant force on the piston, regardless of the position of the piston.

Another alternative is to use a hydraulic or a mixed pneumatic or hydraulic device against the piston.

Also, it will be appreciated that not all of the sensor inputs into the CPU may be required for any particular type of vehicle and, further, if necessary different and additional sensors can be used if these are required to provide optimum operating conditions.

In this specification I have described the general concept of operation of the engine of the invention and several specific proposals as to the way this can be realised.

It is to be understood that these are exemplary rather than definitive as the methods of control can vary greatly whilst still giving the required operations parameters for the engine.

Also, in the drawings I have of course illustrated only one piston but the invention is equally applicable to a multi piston engine and the control of the cylinders could either be unitary, that is that the secondary piston all assume the same position or could be individual so the each secondary piston is separately adjusted for the conditions at the time in which the main piston comes up on the power stroke.

Generally the first of these would be quite acceptable as there would be an overall and continuous movement of the secondary piston but it may be that the second, whilst much more expensive, could be used in sophisticated engines to get the quickest possible response to changes in parameters.

The means to move the secondary piston inwards (thereby increasing compression ratio) is preferably provided by a constant or near constant force acting on the secondary piston, regardless of its position, and the means to move the secondary piston out (thereby decreasing compression ratio) may be provided by elevated combustion pressure acting directly on the secondary piston. If the combustion pressure exceeds that of the applied pressure (i.e. applied constant force multiplied by secondary piston area), the secondary piston moves out to reduce the compression ratio until the applied pressure and peak cylinder pressure balance and thus the secondary piston (i.e. compression ratio) will be near optimally placed in readiness for the next power stroke. This would be in response to an increase in fuel or a decrease in engine speed. If the peak combustion pressure is less than the applied pressure the secondary piston moves to increase the compression ratio until the applied pressure and cylinder peak pressure balance, and thus the secondary piston (i.e. compression ratio), will be near optimally placed in readiness for the next power stroke. This would normally be in response to reduced fuel delivery or an increase in engine speed.

It may be desirable to provide a glow plug and or re-circulation of exhaust gases to enable ready starting of the engine under cold conditions, although, neither of these will normally be needed after the engine has started.

The reason for this is that under cold conditions, the temperature inside the cylinder may be sufficiently low to prevent auto-ignition within the range of adjustments of the compression ration provided by the engine.

If the cylinder is warmed, as by using a glow plug, this difficulty is overcome.

Similarly once the engine starts, but whilst it is still cool, the addition of exhaust gases can increase the temperature of the inlet air and thus the charge temperature after fuel has been injected into this.

Exhaust gas re-circulation may be used on a continued basis whilst the engine is operating in order to control emissions or if the engine is operating in an extremely cold climate or if a particular fuel requires a higher initial charge temperature.

In the specific embodiment of the engine, we have referred to the use of an homogeneous charge. This is an expression used in the art and indicates that the fuel and air are mixed more or less homogeneously, normally by mixing well before entering the combustion volume. The invention could also be used where the mixture occurs just before the fuel/air mix enters the combustion volume as in individual cylinder fuel injection. It is also possible that the invention would be applicable to engines where the liquid fuel is directly injected, as is the case with diesel engines. All such arrangements are within the scope of the invention. A system in which a carburetor or carburetors are used is also satisfactory.

Also, whilst, ill this specification, we have described the invention in relation to piston engines, the invention could be applied to rotary engines. Whilst in the specification generally, we have described the use of a secondary piston in a secondary cylinder, it is to be appreciated that there may he some other form of secondary volume which has a volume varying element. The control of compression ratio, and thus the position of ignition is effected by varying the position of the volume varying element. This could particularly be the case in rotary engines.

I claim:

1. A method for operating an internal combustion auto-ignition engine utilizing a fuel/air mix, comprising the steps of:

providing said internal combustion auto-ignition engine with combustion volumes each having a compression ratio so that the fuel/air mix auto-ignites;

varying an ignition point of the fuel/air mix by dynamically modifying the compression ratio of each said combustion volume of said internal combustion auto-ignition engine, so that auto-ignition commences at a pre-determined point during an engine cycle, the combustion of the fuel occurring so that pressure in each said combustion volume, due to the combustion of the fuel, increases for ensuring that the pressure generated thereby acts during a power stroke of said internal combustion auto-ignition engine.

2. The method for operating an internal combustion auto-ignition engine according to claim 1, further comprising the step of varying the compression ratio via means for adjusting one or more of said combustion volumes of said internal combustion auto-ignition engine.

3. The method for operating an internal combustion auto-ignition engine according to claim 2, wherein said step of varying the compression ratio is due to a variation in one or more parameters: engine temperature, ambient temperature, charge pressure, charge temperature, engine speed, crank angle, fuel delivery and fuel octane rating.

4. The method for operating an internal combustion auto-ignition engine according to claim 2, wherein means for adjusting one or more of said combustion volumes of said step for varying said compression ratio includes a secondary volume and a secondary volume-varying element, along with means for altering position of said secondary volume-varying element, so that the auto-ignition occurs at a required position under particular environmental and internal engine conditions.

5. The method for operating an internal combustion auto-ignition engine according to claim 4, wherein said means for altering position of said secondary volume-varying element for increasing the compression ratio is provided by a substantially constant force acting upon said secondary volume-varying element, and said means for altering position of said secondary volume-varying element for decreasing the compression ratio is accomplished by elevating combustion pressure acting directly upon said secondary volume-varying element.

6. The method for operating an internal combustion auto-ignition engine according to claim 5, wherein when said elevating of the combustion pressure exceeds that of an applied pressure, said secondary-volume varying element moves for decreasing the compression ratio until the applied pressure and the combustion pressure are substantially equal.

7. The method for operating an internal combustion auto-ignition engine according to claim 5, wherein when said elevating of the combustion pressure is less than an applied pressure, said secondary-volume varying element moves for increasing the compression ratio until the applied pressure and the combustion pressure are substantially equal.

8. The method for operating an internal combustion auto-ignition engine according to claim 5, wherein said substantially constant force acting upon said secondary volume-varying element is supplied by a pneumatic system.

9. The method for operating an internal combustion auto-ignition engine according to claim 5, wherein said substantially constant force acting upon said secondary volume-varying element is supplied by a combined pneumatic/hydraulic system.

10. The method for operating an internal combustion auto-ignition engine according to claim 5, wherein said secondary volume comprises a secondary cylinder and said means for altering position of said secondary volume-varying element is a piston within said secondary cylinder, and said substantially constant force acting upon said secondary volume-varying element is via a spring acting against said piston.

11. The method for operating an internal combustion auto-ignition engine according to claim 5, further comprising the step of utilizing means for varying the magnitude of the substantially constant force acting upon said secondary volume-varying element.

12. The method for operating an internal combustion auto-ignition engine according to claim 4, wherein said secondary volume comprises a secondary cylinder and said means for altering position of said secondary volume-varying element is a piston within said secondary cylinder.

13. The method for operating an internal combustion auto-ignition engine according to claim 12, wherein said means for altering position of said secondary volume-varying element is a pneumatic device.

14. The method for operating an internal combustion auto-ignition engine according to claim 12, wherein said means for altering position of said secondary volume-varying element is an electrical device.

15. The method for operating an internal combustion auto-ignition engine according to claim 12, wherein said means for altering position of said secondary volume-varying element is a mechanical device.

16. The method for operating an internal combustion auto-ignition engine according to claim 12, wherein said means for altering position of said secondary volume-varying element is a cam acting on said secondary cylinder for varying its position, said cam having a rotatable cam shaft.

17. The method for operating an internal combustion auto-ignition engine according to claim 16, wherein said further comprising a spring acting against said piston so that in the absence of a positive displacement by said cam, said piston moves to a resting position.

18. An internal combustion auto-ignition engine utilizing a fuel/air mix, comprising:
at least one combustion volume having a compression ratio so that a fuel/air mix is capable of auto-igniting; and,
means for varying an ignition point of the fuel/air mix by dynamically modifying the compression ratio of each said combustion volume of said internal combustion auto-ignition engine, so that auto-ignition commences at a pre-determined point during an engine cycle, the combustion of the fuel occurring so that pressure in each said combustion volume, due to the combustion of the fuel, increases for ensuring that the pressure generated thereby acts during a power stroke of said internal combustion auto-ignition engine, said means for varying an ignition point of the fuel/air mix further including a secondary volume and a secondary volume-varying element, along with means for altering position of said secondary volume-varying element, so that the auto-ignition occurs at a required position under particular environmental and internal engine conditions.

19. The internal combustion auto-ignition engine utilizing a fuel/air mix according to claim 18, wherein said means for altering position of said secondary volume-varying element for increasing the compression ratio includes means providing for a substantially constant force acting upon said secondary volume-varying element, and said means for altering position of said secondary volume-varying element for decreasing the compression ratio includes means for elevating combustion pressure acting directly upon said secondary volume-varying element.

20. The internal combustion auto-ignition engine utilizing a fuel/air mix according to claim 19, wherein when said elevating of the combustion pressure exceeds that of an applied pressure, said secondary-volume varying element moves for decreasing the compression ratio until the applied pressure and the combustion pressure are substantially equal.

21. The internal combustion auto-ignition engine utilizing a fuel/air mix according to claim 19, wherein when said elevating of the combustion pressure is less than an applied pressure, said secondary-volume varying element moves for increasing the compression ratio until the applied pressure and the combustion pressure are substantially equal.

22. The internal combustion auto-ignition engine utilizing a fuel/air mix according to claim 19, wherein said substantially constant force acting upon said secondary volume-varying element is supplied by a pneumatic system.

23. The internal combustion auto-ignition engine utilizing a fuel/air mix according to claim 19, wherein said substantially constant force acting upon said secondary volume-varying element is supplied by a combined pneumatic/hydraulic system.

24. The internal combustion auto-ignition engine utilizing a fuel/air mix according to claim 19, further comprising means for varying the magnitude of the substantially constant force acting upon said secondary volume-varying element.

25. The internal combustion auto-ignition engine utilizing a fuel/air mix according to claim 18, wherein said secondary volume comprises a secondary cylinder and said means for altering position of said secondary volume-varying element is a piston within said secondary cylinder.

26. The internal combustion auto-ignition engine utilizing a fuel/air mix according to claim 18, wherein said means for altering position of said secondary volume-varying element is a pneumatic device.

27. The internal combustion auto-ignition engine utilizing a fuel/air mix according to claim 18, wherein said means for altering position of said secondary volume-varying element is an electrical device.

28. The internal combustion auto-ignition engine utilizing a fuel/air mix according to claim 18, wherein said means for altering position of said secondary volume-varying element is a mechanical device.

29. The internal combustion auto-ignition engine utilizing a fuel/air mix according to claim 18, wherein said means for altering position of said secondary volume-varying element is a cam acting on said secondary cylinder for varying its position, said cam having a rotatable cam shaft.

30. The internal combustion auto-ignition engine utilizing a fuel/air mix according to claim 29, further comprising a spring acting against said piston so that in the absence of a positive displacement by said cam, said piston moves to a resting position.

31. The internal combustion auto-ignition engine utilizing a fuel/air mix according to claim 18, further comprising a central processing unit having a memory into which environmental and internal engine parameters are able to be inputed for calculating a substantially optimal compression ratio for said internal combustion auto-ignition engine.

32. The internal combustion auto-ignition engine utilizing a fuel/air mix according to claim 31, further comprising:

means for reducing fuel delivery to said internal combustion auto-ignition engine when the compression ratio is less than the substantially optimal compression ratio.

33. The internal combustion auto-ignition engine utilizing a fuel/air mix according to claim 32, further comprising:

means for ceasing fuel delivery to said internal combustion auto-ignition engine until the compression ratio adapts to a rate of fuel intake that prevents misfiring.

34. The internal combustion auto-ignition engine utilizing a fuel/air mix according to claim 31, further comprising:

means for increasing fuel delivery to said internal combustion auto-ignition engine when the compression ratio is greater than the substantially optimal compression ratio.

35. The internal combustion auto-ignition engine utilizing a fuel/air mix according to claim 18, further comprising:

means for increasing temperature within each said combustion volume under cold-starting and cold-running conditions.

* * * * *